United States Patent
Klemenz

(10) Patent No.: US 10,216,615 B2
(45) Date of Patent: Feb. 26, 2019

(54) DEBUGGABLE INSTANCE CODE IN A CLOUD-BASED INSTANCE PLATFORM ENVIRONMENT

(71) Applicant: SAP SE, Walldorf (DE)

(72) Inventor: Oliver Klemenz, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/638,982

(22) Filed: Jun. 30, 2017

(65) Prior Publication Data

US 2019/0004931 A1    Jan. 3, 2019

(51) Int. Cl.
| | |
|---|---|
| *G06F 9/44* | (2018.01) |
| *G06F 9/45* | (2006.01) |
| *G06F 9/445* | (2018.01) |
| *G06F 11/36* | (2006.01) |
| *G06F 9/455* | (2018.01) |

(52) U.S. Cl.
CPC ...... *G06F 11/3636* (2013.01); *G06F 9/45533* (2013.01); *G06F 11/3624* (2013.01); *G06F 11/3644* (2013.01); *G06F 2009/45591* (2013.01)

(58) Field of Classification Search
CPC ............. G06F 9/45533; G06F 11/3624; G06F 11/3644; G06F 11/3636; G06F 11/45533
See application file for complete search history.

(56) References Cited

U.S. PATENT DOCUMENTS

| | | | |
|---|---|---|---|
| 6,795,963 B1* | 9/2004 | Andersen | G06F 11/3628 714/E11.209 |
| 9,146,834 B2* | 9/2015 | Smiljanic | G06F 11/3664 |
| 9,779,133 B2* | 10/2017 | Bhagavan | G06F 11/3664 |
| 9,819,758 B2* | 11/2017 | Chen | H04L 67/28 |
| 2006/0130021 A1* | 6/2006 | Plum | G06F 11/3624 717/140 |
| 2011/0047415 A1* | 2/2011 | Nanjundaswamy | G06F 11/3636 714/37 |

(Continued)

OTHER PUBLICATIONS

'Microsoft SQL Server, SQL Server In-Memory OLTP and Columnstore Feature Comparison, 2016, pp. 1-16. https://whitepaper.silicon.co.uk/resource/sql-server-memory-oltp-columnstore-feature-comparison?inf_by=5b7c59af671db8832b8b4bec (Year: 2016).*

(Continued)

*Primary Examiner* — Mongbao Nguyen
(74) *Attorney, Agent, or Firm* — Schwegman Lundberg & Woessner, P.A.

(57) ABSTRACT

In an example, a request is received from a runtime platform to run an instance of a software function. In response, instance code and instance data corresponding to the instance are loaded from a persistent storage, the instance code and instance data being stored together in the persistent storage. It is determined whether there is an indication that the instance code should be executed in a debug mode. In response to a determination that the instance code should be executed in the debug mode, source code is generated for the instance, based on the instance code, in a debug folder in the persistent storage; a runtime cache for the instance is invalidated; the source code for the instance is compiled into an executable file, the compiling including adding one or more breakpoints to the executable file; and the executable file is sent to the runtime platform for execution.

11 Claims, 12 Drawing Sheets

(56) References Cited

U.S. PATENT DOCUMENTS

| | | | |
|---|---|---|---|
| 2013/0152047 A1* | 6/2013 | Moorthi | G06F 11/368 717/124 |
| 2013/0305230 A1* | 11/2013 | Inoue | G06F 8/443 717/153 |
| 2014/0007043 A1* | 1/2014 | Aliseychik | G06F 9/4881 717/106 |
| 2014/0007044 A1* | 1/2014 | Aliseychik | G06F 8/30 717/106 |
| 2014/0215443 A1* | 7/2014 | Voccio | G06F 11/3612 717/128 |
| 2015/0033078 A1* | 1/2015 | Wintergerst | G06F 11/362 714/38.1 |
| 2015/0058824 A1* | 2/2015 | Smiljanic | G06F 11/3636 717/125 |
| 2015/0113513 A1* | 4/2015 | Aggag | G06F 8/48 717/140 |
| 2016/0092250 A1* | 3/2016 | Wagner | G06F 9/45558 718/1 |
| 2016/0291951 A1* | 10/2016 | Dahan | G06F 8/47 |
| 2017/0364431 A1* | 12/2017 | Beraldo dos Santos | G06F 11/366 |
| 2018/0089061 A1* | 3/2018 | Cook | G06F 11/362 |
| 2018/0121323 A1* | 5/2018 | Tucker | G06F 11/3636 |
| 2018/0121324 A1* | 5/2018 | Tucker | G06F 11/3636 |
| 2018/0165177 A1* | 6/2018 | Gupta | G06F 11/3664 |

OTHER PUBLICATIONS

Yong Xiang, Debugging OpenStack Problems Using a State Graph Approach, 2016, pp. 1-8. http://iiis.tsinghua.edu.cn/~weixu/files/apsys-xiang.pdf (Year: 2016).*

Yago Torroja, A Serial Port Based Debugging Tool to Improve Learning With Arduino, 2015, pp. 1-4. https://ieeexplore.ieee.org/stamp/stamp.jsp?tp=&arnumber=7388612 (Year: 2015).*

Haoqiong Bian, Wide Table Layout Optimization based on Column Ordering and Duplication, 2017, pp. 1-16 https://dl.acm.org/citation.cfm?id=3035930 (Year: 2017).*

Zhiqiang Lin, SigGraph: Brute Force Scanning of Kernel Data Structure Instances Using Graph-based Signatures, 2011, pp. 1-18. http://web.cse.ohio-state.edu/~lin.3021/file/SigGraph_NDSS11.pdf (Year: 2011).*

* cited by examiner

```
  L-ERP =/DOCUMENTS/GIT/I-ERP
   DEBUG
   CAR
      11385245.JS              1  var i = require("./Car");
      CAR.JS                   2
      CARPROCESS               3  i.$_check_$buy = function (i, context) { return true; };
      CARREFITPROCESS          4
      HEATING                  5  module.exports = i;
   DEMO
   DOCS
   LOGS
   NODE_MODULES LIBRARY ROOT
   PROGRAMS
   SCENARIO
   SRC
      I-API.JS
      I-CK.JS
      I-DO-ARANGODB.JS
      I-DB-HANA.JS
      I-MBDN.JS
      I-ODATA.JS
      I-PROCESS-BPMN.JS
      I-REST.JS
   TEST
   UI
      .GITIGNORE
      DEFAULTS.JSON
      INDEX.JS
      PACKAGE.JSON
      README.MD
      EXTERNAL LIBRARIES
```

*FIG. 10*

DEBUGGABLE INSTANCE CODE IN A CLOUD-BASED INSTANCE PLATFORM ENVIRONMENT

TECHNICAL FIELD

This document generally relates to systems and methods for computer platform environments. More specifically, this document relates to debuggable instance code in a cloud-based instance platform environment.

BACKGROUND

Traditional cloud-based computer platforms operate by executing static code containing one or more predefined processes. This static code may then, at runtime, cause the generation of one or more instances, which are concrete occurrences of the processes. Thus, each user running a particular cloud-based application will actually be running a separate instance of the application.

Enterprise Resource Planning (ERP) systems are cloud-based platforms driven by business documents, such as sales orders in the case of customer ordering and sale processes, and production orders in the case of production and logistics processes. In all these cases, the business documents are an abstraction at the software level and use data containers for the processes, but they do not reflect the real physical occurrences in that physical process. Thus, for example, the customer may run an instance of a product-ordering process, which may cause the creation of a sales order for a particular product (for example, a particular model of mobile device with a particular serial number), but the sales order itself is not reflected in the instance of the underlying software process building it.

This leads to particular technical impediments when, for example, certain processes cannot be supported by older business documents. A major drawback with standard business documents is that they are local, i.e., company-internal. A sales order or a production order is not normally visible to other companies, which inhibits cross-organization processes, such as two different entities (e.g., customer and manufacturer) interacting with the same business document.

BRIEF DESCRIPTION OF DRAWINGS

The present disclosure is illustrated by way of example and not limitation in the figures of the accompanying drawings, in which like references indicate similar elements.

FIG. 7 is an example of a template code snippet, in accordance with an example embodiment.

FIG. 9 is a diagram illustrating generated debug code for a template, in accordance with an example embodiment.

FIG. 10 is a diagram illustrating generated debug code for an instance.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a cloud-based instance platform is utilized that creates a virtual cloud representation of an instance, including code pertaining to the instance as well as data structures containing actual data such as sales orders or production orders. All this information is available in a single instance, which is made accessible centrally. This allows processes to be changed on demand, and new involved parties to be invited on the fly to the instance. Furthermore, different perspectives on the instance's data can be shared and collaborative processes on instances can be enabled.

Thus, this results in technical improvements in the functioning of computer systems, including permitting:

ad-hoc cross-organization collaboration, customer involvement before, during, and after the production process (e.g., producer queries to customer, to confirm correctness of configuration and order, or to inform customer about unavailability of parts of configuration or variations);

all involved parties to have a complete 360-degree, end-to-end view of the instance from emergence to disappearance (with alignment with their role-specific perspectives on the instance);

customers to trigger after-sales additional processes on the instance (e.g., a warranty request); and suppliers to trigger after-sales additional processes on the instance (e.g., recall requests).

It is not possible from the technical standpoint for the above use-cases to be performed by traditional ERP systems, as the instances are not known (at best, perhaps the instance class of the instance is known), and this information does not leave the boundaries of the organization.

Figure 1:
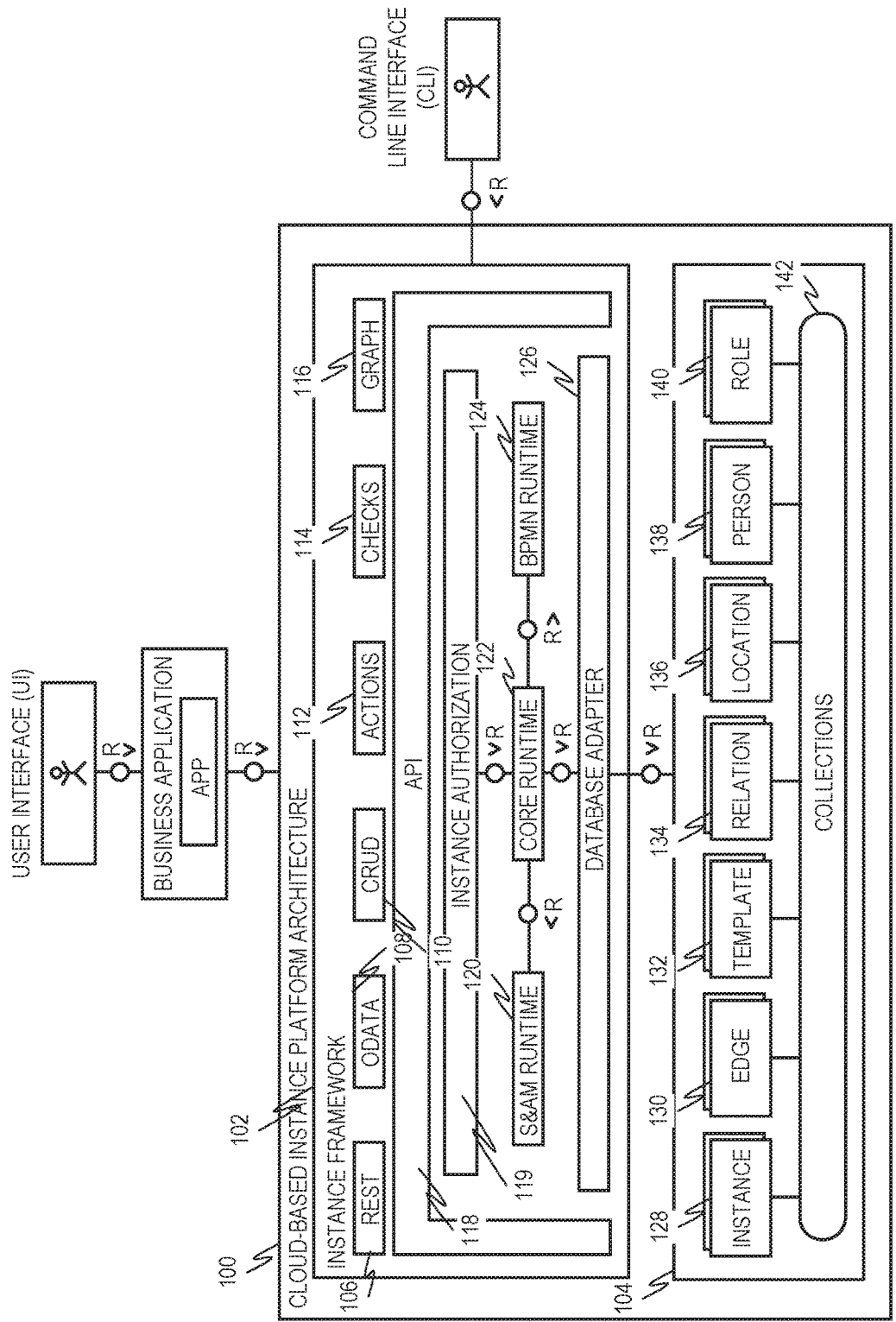
FIG. 1 is a block diagram illustrating a cloud-based instance platform architecture, in accordance with an example embodiment.

FIG. 1 is a block diagram illustrating a cloud-based instance platform architecture 100, in accordance with an example embodiment. The cloud-based instance platform architecture 100 includes an instance framework 102 and an in-memory database management system 104. A Representational State Transfer (REST)ful protocol component 106 allows the instance to access instance services and also supports batch processing. An OData protocol component 108 allows instances to conform with the standardized OData protocol for reading entities. A Create, Read, Update, and Delete (CRUD) component 110 allows for the creation, reading, updating, and deleting of instances. An actions component 112 provides custom actions, defining instance logic next to the standard CRUD services defined in the CRUD component 110. A checks component 114 defines logic as to when an action is to be executed, leading to the enabling or disabling of certain actions and describing the inner consistency of an instance. A graph component 116 builds graph data structures and combines these graph data structures with a network. Graph traversal allows the platform to obtain information from an instance and send it to a referenced instance, or to trace back an instance from a current instance in the opposite direction.

An application programming interface (API) 118 provides capabilities for the various components 106-116 described above to interact with other components in the instance framework 102. An instance authorization component 119 provides authorization for different perspectives on the same instance data to different involved parties.

A status & action model (S&AM) runtime 120 describes the instance in the following areas:
1. Status Variables: Attribute of the instance containing a code list expressing a status
2. Status Values: Values of a status variable and therefore values in the code list
3. Actions: Exposed actions of the instance, describing the result of the action execution
4. Action Execution Conditions: Pre-conditions to status variable values, that enable an action, that are required for action enablement, and that inhibit action enablement
5. Action Result: Action execution triggers status variable value changes
6. Properties: Description of all actions of an instance, whether enabled or disabled.

A core runtime 122 is the backbone of the instance, bringing the instance to life, by providing an instance runtime and running the instance execution logic. A Business Process Model and Notation (BPMN) runtime 124 performs process modeling, expressing sequences in which the actions shall be executed in a default process path and in process path variations, if applicable.

The runtimes 120-124 connect to the in-memory database management system 104 via a database adapter 126, which builds an abstraction layer from the core runtime 122 to the in-memory database management system 104. The core runtime 122 also leverages additional modeling information, enhancing S&AM and BPMN runtime modeling with the following information:
1. Role: Roles define statically how someone who owns the role can access an instance. Roles are used by the instance authorization to enforce the perspective on an instance for a certain role, user, or group
2. Privileges: Roles grant privileges to the role holder (e.g., read, write, or custom actions)
3. Person: A user or a group, having access to and a certain perspective on an instance because of the roles assigned to the person.

The instance is available as a singleton in the cloud. The cloud-based instance platform architecture 100 manages this instance and exposes the virtual instance under a stable address that does not change during the whole life-cycle of the instance. Each party/organization which is or should be involved with the instance gets access to the virtual instance via the stable address. Although a party has access to see the instance, a complex instance-based authorization concept grants different perspectives on the same instance data to different involved parties.

The in-memory database management system 104 persists data in volatile system memory rather than on-disk. This data may include instantiated instances 128, edges 130, templates 132, relations 134, locations 136, persons 138, and roles 140, all of which may be stored in collections 142.

The instances 128 may be comprised of sub-instances, and the representation of instances as graph networks gives excellent flexibility between the competitive tasks of accessing each instance directly versus accessing instances via composition or association relationships. The in-memory database management system 104 offers efficient modeling of graphs based on column store persistency. In an example embodiment, the in-memory database management system 104 organizes the data as a document database, as opposed to, for example, a relational database.

Instances are also very flexible in regard to what data is persisted. Extensibility is a core concept of the instance platform. Here, the in-memory database management system 104 offers excellent flexibility by leveraging the new document store, allowing it to efficiently persist schema-less data.

In an example embodiment, instances become the new data models in business processes inside the instance-based platform. Instances may, for example, contain JavaScript Object Notation (JSON) documents, have relations such as associations and compositions, hold states, be template-based, be extended, be executed, be authorized, have a history, have privileges, have assigned roles, have root-level perspectives, have process instances, represent physical instances, be self-contained, have constraints, etc.

Figure 2:
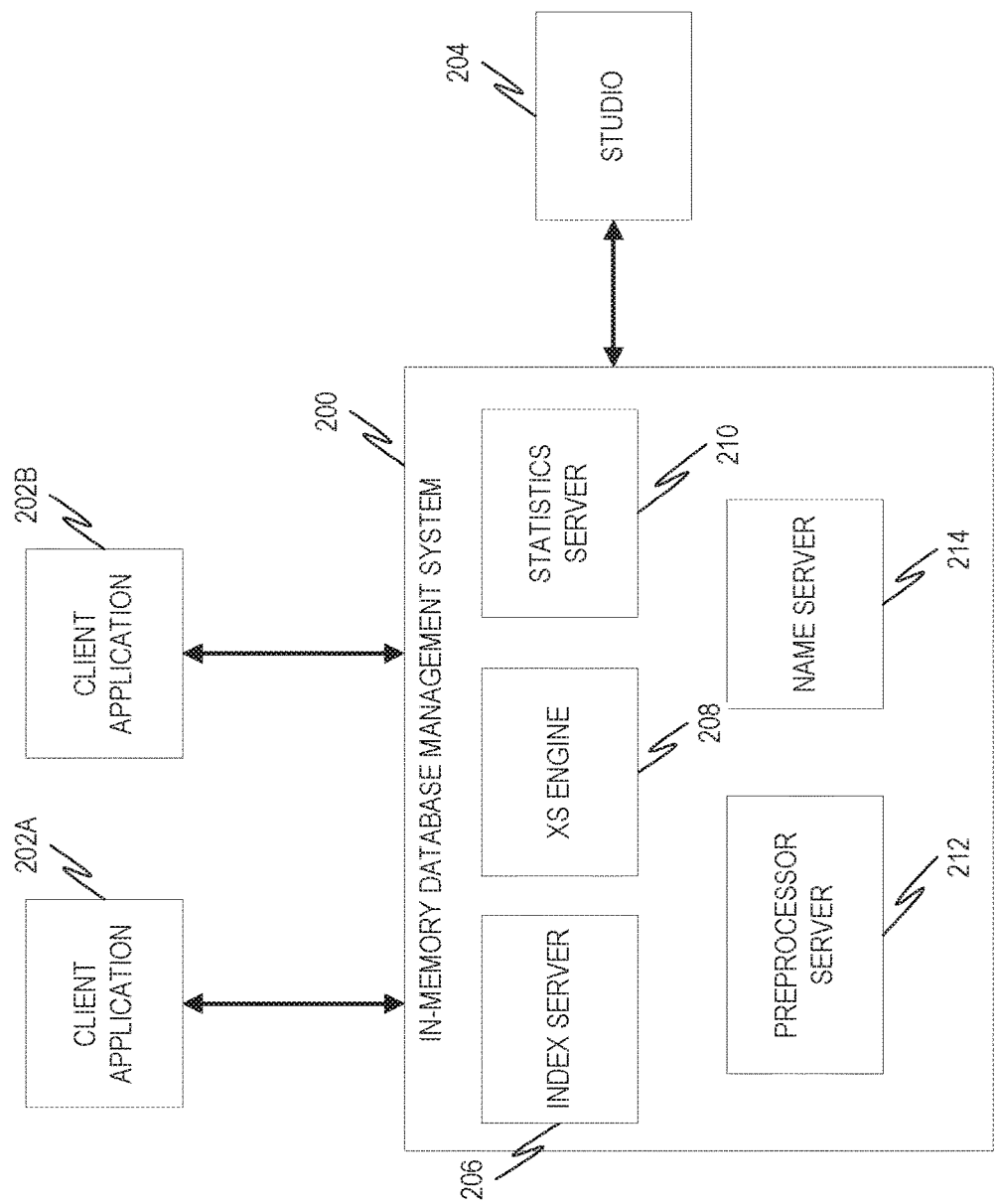
FIG. 2 is a diagram illustrating an in-memory database management system, including its client/external connection points, which can be kept stable in the case of disaster recovery to ensure stable service operations, in accordance with an example embodiment.

FIG. 2 is a diagram illustrating an in-memory database management system 200, including its client/external connection points, which can be kept stable in the case of disaster recovery to ensure stable service operations, in accordance with an example embodiment. Here, the in-memory database management system 200 may be coupled to one or more client applications 202A, 202B. The client applications 202A, 202B may communicate with the in-memory database management system 200 through a number of different protocols, including Structured Query Language (SQL), Multidimensional Expressions (MDX), Hypertext Transfer Protocol (HTTP), REST, and Hypertext Markup Language (HTML).

Also depicted is a studio 204, used to perform modeling or basic database access and operations management by accessing the in-memory database management system 200.

The in-memory database management system 200 may comprise a number of different components, including an index server 206, an XS engine 208, a statistics server 210, a preprocessor server 212, and a name server 214. These components may operate on a single computing device, or may be spread among multiple computing devices (e.g., separate servers).

The index server 206 contains the actual data and the engines for processing the data. It also coordinates and uses all the other servers.

The XS engine 208 allows clients to connect to the cloud-based instance platform architecture 100 using web protocols, such as HTTP.

The statistics server 210 collects information about status, performance, and resource consumption from all the other server components. The statistics server 210 can be accessed from the studio 204 to obtain the status of various alert monitors.

The preprocessor server 212 is used for analyzing text data and extracting the information on which text search capabilities are based.

The name server 214 holds information about the database topology. This is used in a distributed system with instances of the database on different hosts. The name server 214 knows where the components are running and which data is located on which server.

Figure 3:
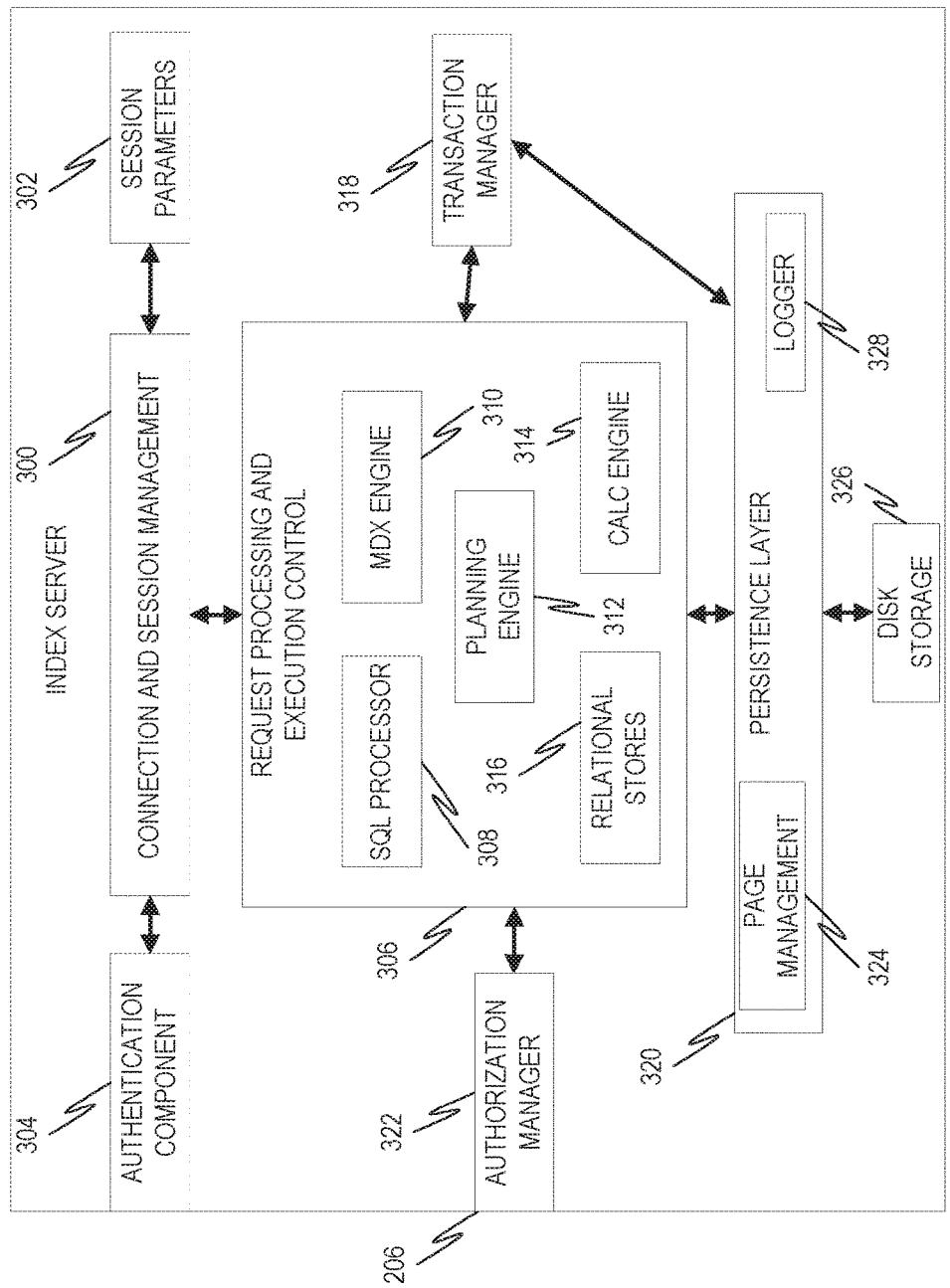
FIG. 3 is a diagram illustrating an index server, in accordance with an example embodiment.

FIG. 3 is a diagram illustrating an index server 206, in accordance with an example embodiment. Specifically, the index server 206 of FIG. 2 is depicted in more detail. The index server 206 includes a connection and session management component 300, which is responsible for creating and managing sessions and connections for the database clients. Once a session is established, clients can communicate with the database system using SQL statements. For each session, a set of session parameters 302 may be maintained, such as auto-commit, current transaction isolation level, etc. Users (e.g., system administrators, developers) may be authenticated by the database system itself (e.g., by logging in with user name and password, using an authentication component 304), or authentication can be delegated to an external authentication provider such as a Lightweight Directory Access Protocol (LDAP) directory.

The client requests can be analyzed and executed by a set of components summarized as request processing and execution control 306. An SQL processor 308 checks the syntax and semantics of the client SQL statements and generates a logical execution plan. Multidimensional expressions (MDX) are a language for querying and manipulating multidimensional data stored in online analytical processing (OLAP) cubes. As such, an MDX engine 310 is provided to allow for the parsing and executing of MDX commands. A planning engine 312 allows applications (e.g., financial planning applications) to execute basic planning operations in the database layer. One such operation is to create a new version of a dataset as a copy of an existing dataset, while applying filters and transformations.

A calc engine 314 implements the various SQL script and planning operations. The calc engine 314 creates a logical execution plan for calculation models derived from SQL scripts, MDX, planning, and domain-specific models. This logical execution plan may include, for example, breaking up a model into operations that can be processed in parallel.

The data is stored in relational stores 316, which implement a relational database in main memory.

Each SQL statement may be processed in the context of a transaction. New sessions are implicitly assigned to a new transaction. A transaction manager 318 coordinates database transactions, controls transactional isolation, and keeps track of running and closed transactions. When a transaction is committed or rolled back, the transaction manager 318 informs the involved engines about this event so they can execute needed actions. The transaction manager 318 also cooperates with a persistence layer 320 to achieve atomic and durable transactions.

An authorization manager 322 is invoked by other database system components to check whether the user has the specified privileges to execute the requested operations. The database system allows for the granting of privileges to users or roles. A privilege grants the right to perform a specified operation on a specified object.

The persistence layer 320 ensures that the database is restored to the most recent committed state after a restart and that transactions are either completely executed or completely undone. To achieve this goal in an efficient way, the persistence layer 320 uses a combination of write-ahead logs, shadow paging, and save points. The persistence layer 320 also offers a page management interface 324 for writing and reading data to and from a separate disk storage 326, and also contains a logger 328 that manages the transaction log. Log entries can be written implicitly by the persistence layer 320 when data is written via the persistence interface or explicitly by using a log interface.

Figure 4:
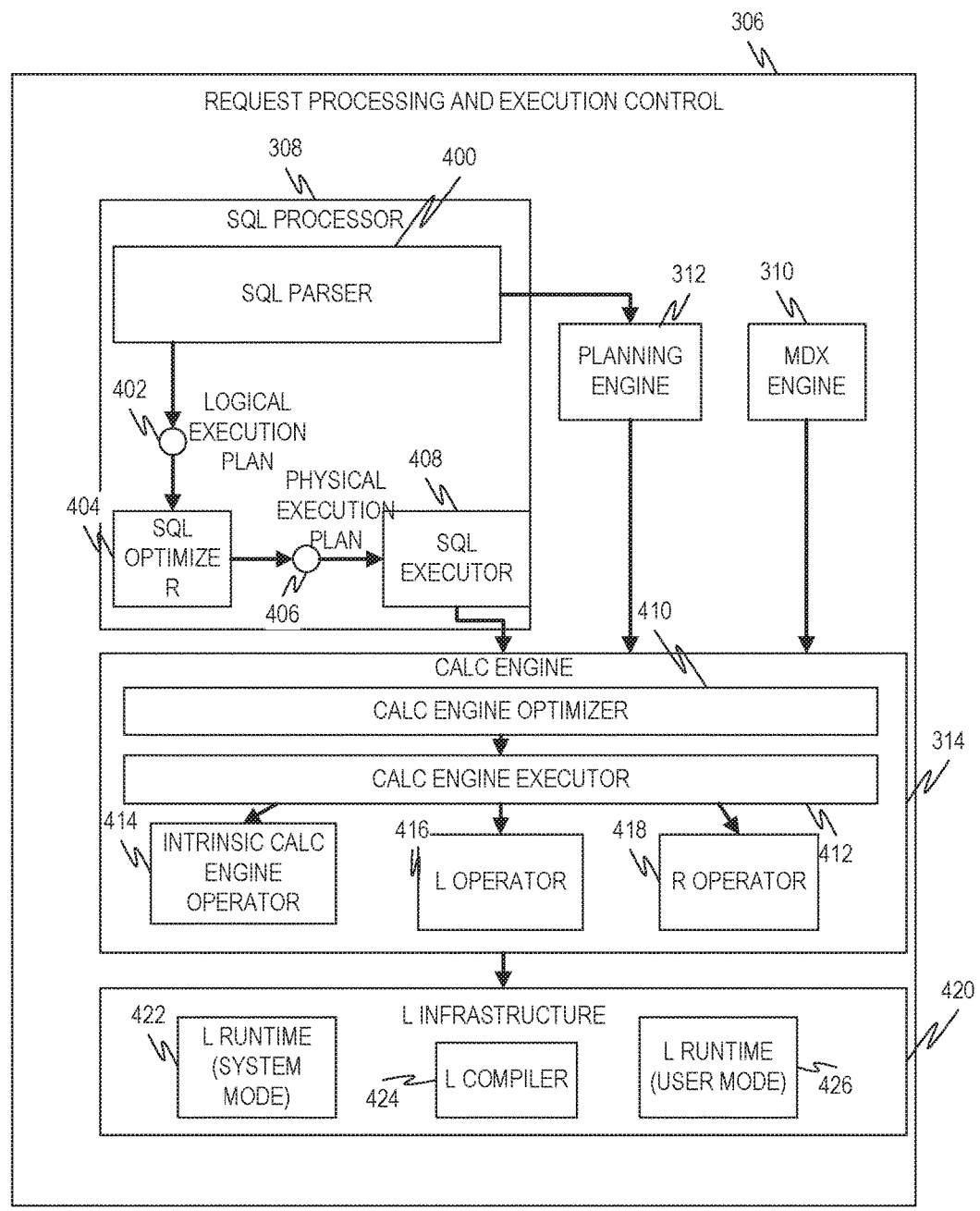
FIG. 4 is a diagram illustrating a request processing and execution control, in accordance with an example embodiment.

FIG. 4 is a diagram illustrating a request processing and execution control 306, in accordance with an example embodiment. This diagram depicts the request processing and execution control 306 of FIG. 3 in more detail. The SQL processor 308 contains an SQL parser 400, which parses an SQL statement and generates a logical execution plan 402, which it passes to an SQL optimizer 404. The SQL optimizer 404 then optimizes the logical execution plan 402 and converts it to a physical execution plan 406, which it then passes to an SQL executor 408. The calc engine 414 implements the various SQL script and planning operations, and includes a calc engine optimizer 410, which optimizes the operations, and a calc engine executor 412, which executes the operations, as well as an intrinsic calc engine operator 414, an L operator 416, and an R operator 418.

An L infrastructure 420 includes a number of components to aid in the running of L procedures, including an L-runtime (system mode) 422, an L compiler 424, and an L-runtime (user mode) 426.

In an example embodiment, instances can be template-based. This helps to reduce the need to copy the same code over and over again for different instances. Instances do not have a class they conform to, but templates can be used for a similar feature, which is used as a copy template during instance creation.

Figure 5:
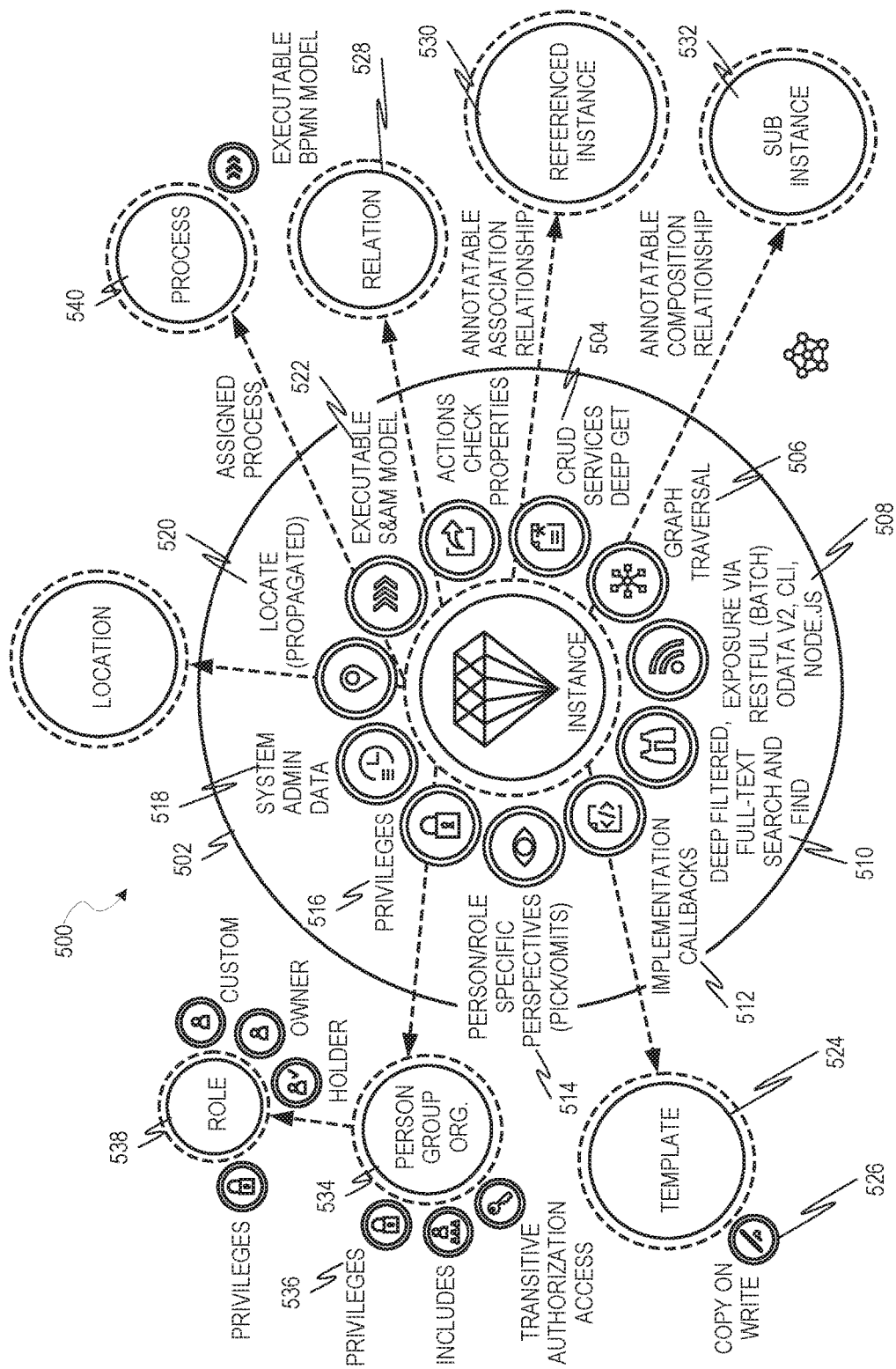
FIG. 5 is a block diagram illustrating a logical representation of an instance platform, in accordance with an example embodiment.

FIG. 5 is a block diagram illustrating a logical representation of an instance platform 500, in accordance with an example embodiment. The instance platform 500 includes an instance 502. This figure depicts various functionality that is available in the instance platform 500. CRUD services 504 allow a core instance service in the instance 502 to create, read, update, and delete the instance 502. This functionality may include deep get, where the instance 502 can be retrieved deeply via the composition relationships. A graph traversal service 506 allows instances to build a graph formation. Exposure services 508 allow the instance 502 to be electronically consumed. This may include various protocol interfaces such as REST and OData, as well as a command-line interface (CLI) to interactively communicate with instances, and JavaScript interfaces.

A deep filtered full-text search and find service 510 allows instances to be searched via full text and in addition filtered according to one or more filtering conditions.

An implementation callback service 512 allows instances to be extended to inject server code running inside the instance during action or service execution. The implementation callbacks are part of the instance, which means an instance is a live self-executing entity.

Person/role-specific perspectives 514 allow for picks, which define which parts of an instance are visible to a person/role, and omits, which define which parts of an instance are not visible to a person/role.

Privileges 516 define the privileges a person/role has for an instance (e.g., read, write).

System administrative data 518 indicates instance records, such as who created the instance, who modified the instance, and when.

A locate service 520 recognizes that an instance always has a location that corresponds with the location of a physical instance. Instances composed as sub-instances in another instance inherit the location as the location is propagated.

An executable S&AM model 522 allows for actions, such as custom actions defining instance logic next to the standard CRUD services; checks, which define logic such as when an action can be executed, leading to the enabling or disabling of certain actions and describing the inner consistency of the instance; and properties, giving a descriptive view of the instance, explaining which action can be executed, which attributes can be changed, etc.

Templates 524 provide the aforementioned templating functionality.

Copy on write 526 allows for code copying from templates to instances. When code is changed on the instance, it is copied on the fly from the template, to be adjusted. Instances are disconnected from their templates. Code changes on the instance do not affect code changes on the templates or on other instances.

Relations 528 allow instances to have different relations among each other. A relation collection keeps track of which relations exist for which instances with which semantics.

A referenced instance 530 is an annotatable association relationship, expressing that two instances are connected via an association.

A sub-instance 532 is an annotatable composition relationship, which expresses that an instance is part of another instance. The location is propagated, and composed instances are destroyed with their owner instance. Furthermore, an instance is only composed once, so that the composition represents a physical composition relationship.

Person/group/organization features 534 allow users or groups to have access to the same instance. Groups can be nested with sub-groups so that users inherit authorization access via the group inclusion relationship. Organizations are top-level groups, allowing cross-organization collaboration.

Privileges 536 define the privileges a person/role has for an instance.

Roles 538 allow each person to have different roles for the instance. This may include the roles of owner and holder as well as custom roles, such as dealer, customer, carrier, buyer, etc.

Processes 540 allow one or more processes to be executed on the instance, such as an executable BPMN model.

In an example embodiment, the instance platform 500 can be used to build new business processes that are centered around the "real" instances, instead of focusing on generic business documents. The "real" instance is in most cases the virtual representation in the cloud of a physical instance. The physical instance is connected to the virtual instance, and in the best case, can directly access the virtual instance in the cloud.

One example is a car instance, which has online access and can directly access its virtual dependent in the cloud, to enable new processes and services. For example, it could display data from the virtual instance in the cockpit of the physical instance. Services are now possible, by which the car manufacturer can trigger an unplanned service, such as a recall of the built-in airbags. The manufacturer can directly access the holder of the car, as the car instance itself can display status information in the cockpit to transport this information. The car manufacturer can trigger this service, but as it has the vendor perspective, it can in no way see the current location or the current owner/holder of the car instance. It just triggers the service request, so that the car holder can visit the garage for service.

On the other hand, the customer can also trigger a new process on the car instance, e.g., requesting warranty for a broken part of the car. The customer cannot see the car service details of the car repair, but the warranty request is confirmed when the incident is solved.

As the instance is available as a singleton only on the single cloud instance platform, the instance stores all information around the instance in itself, from creation until removal (if applicable). The instance gets a unique address in the cloud instance platform, which never changes. This address could be used to link the virtual instance in the cloud with the corresponding physical instance, e.g., by Quick Response (QR) code, radio-frequency identification (RFID), hardware component, etc.

One potential technical issue involved in the use of an instance-based cloud platform is in debugging. Traditional ERP software tools are debugged prior to or during compilation using one or more debugging tools. It can be difficult to transfer this paradigm to a case where the code needing to be debugged is contained within an instance. In an example embodiment, a mechanism is provided that transforms static code execution to the execution of code within a single instance, allowing for the possibility to let each business entity instance have different application logic and execute itself while still having good code maintainability through the concept of instance code debugging.

This is in contrast with the static code approach, which is defined on the class-function level, running for each data portion and/or business instance the same way. Flexibility is only possible in such systems by distinguishing different evaluation paths in the static application code itself by introducing if statements, switch statements, or code polymorphism. This means that the static code contains all variants of application logic in order to fulfil the requirement to run different instances/objects differently. Which evaluation path is taken is decided by so-called control flow conditions. This leads to several technical drawbacks. As all evaluation flows are logically in one static code, the readability of such code suffers. Additionally, a large amount of nesting or splitting up code into different code files reduces maintainability. Additionally, new code needs to be injected somehow into already completed static code, even though it may only be relevant for certain conditions and data portions, and a code patch is needed to introduce new code into a static code file. Furthermore, although code is not relevant for certain instances, certain parts of it still need to be run in order to decide that it is not relevant. This leads to a performance cost for instances that only need a specific evaluation flow in the code.

Instead of having static code executing logic on data, the cloud-based instance platform turns around the way code is stored and executed and has the instances contain and run the code themselves. Thus, only the code needed for a certain instance needs to be assigned to that instance and later executed accordingly. This improves flexibility, maintainability, and performance. Code patches are generally not needed, as new code can be introduced with new instances.

As described above, in an example embodiment, code is not statically available in the application context but is stored within the instance and run by executing the instance. The instance code is generated on the fly and provided to the runtime execution engine to be executed when requested.

The instance code is persisted with the instance data. The instance code is stored with the instance data. When the buy action is executed from an API consumer, the internal instance platform execution engine creates, on the fly, the corresponding code snippet in memory, to be executed immediately. The function code is executed as it would be if it were static, although this code is only relevant for this single instance.

As described earlier, it is not necessary to repeat instance code over and over for instances that use the same, or similar, code. If it were, then maintainability would suffer, as a bug fix or security patch would need to be iterated over a large number of instances. As such, in an example embodiment, the concept of templates is introduced.

A template is a copy reference for an instance. It can contain code as well as the instance. Instances can be derived from one or more templates, and templates could also form a hierarchy of templates. Strictly there is no class inheritance, and therefore multiple template referencing is permitted. Templates may be applied in a well-defined order and the resulting instances and corresponding instance code can be derived.

A copy is merged from the referenced templates in the specified sequence, and the last step is enhanced by the real instance-specific code.

Figure 6:
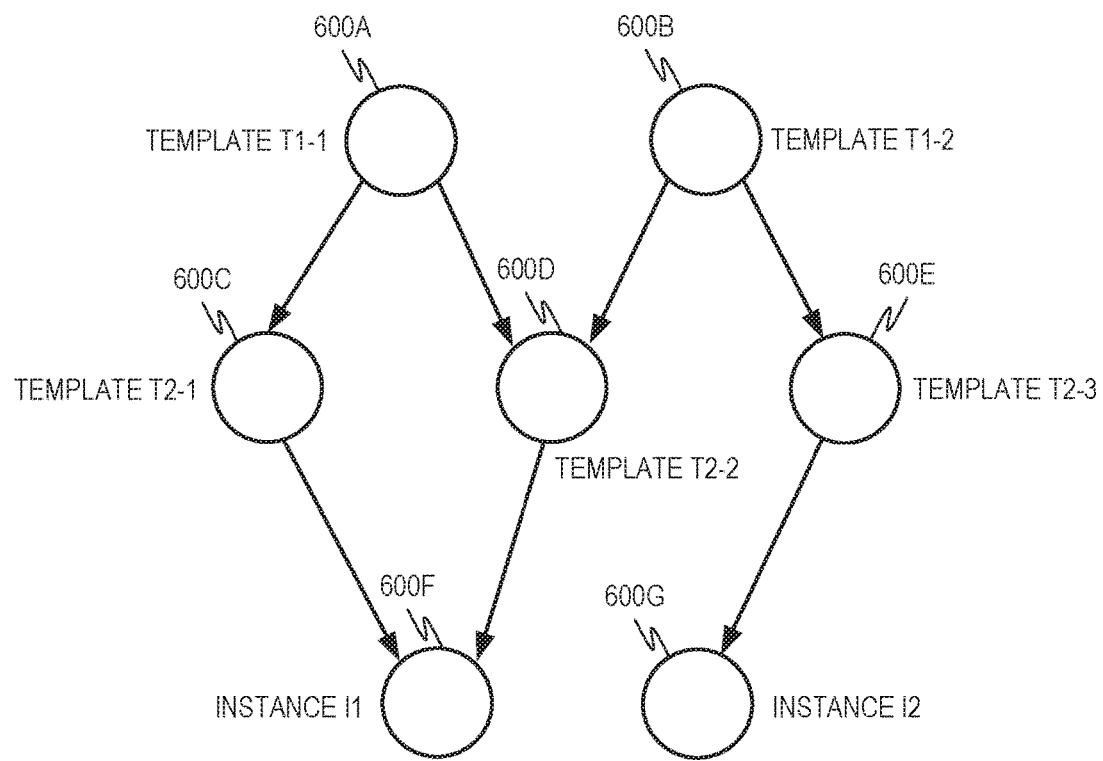
FIG. 6 is a block diagram illustrating how instance code can be added to different levels via templates.

FIG. 6 is a block diagram illustrating how instance code can be added to different levels via templates. Instance code is merged in the specified order, through a hierarchy of templates 600A-600G to the instance. Code can override and/or enhance code defined previously.

Figure 7:
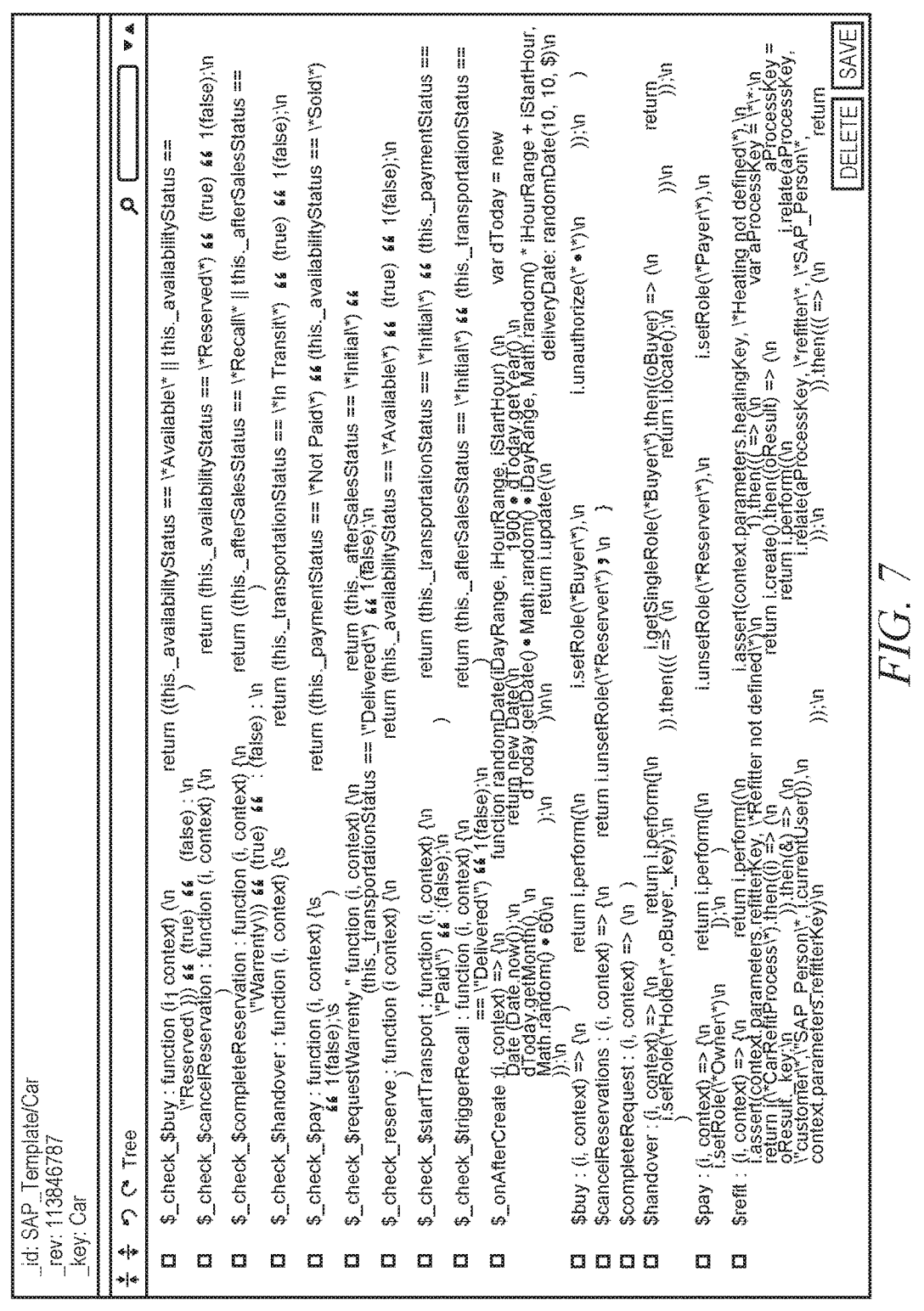

FIG. 7 is an example of a template code snippet, in accordance with an example embodiment. As can be seen, the template "Car" includes instance code, which is defined on the template level. All instances using this template, here all Car instances, merge the template code with their inherent instance code. Thus, the template function $_check_$buy is merged on the instance level and replaced by the instance function $_check_$buy for instance Car/11385245, always evaluating to true. For all other Car instances, the template function is evaluated, as the assumption is that, for other instances, no additional functions are defined and merged on the instance level.

In case a template code function needs to be further specified on an instance level, the function code can be edited on the instance level, overwriting the template function code. This procedure is called copy-on-write, where the code moves (e.g., is copied) from a template level to a deeper template level or at last to the instance level, and can be edited/written there. This allows for the most flexibility to get, for defining for an instance, the exact amount of code it needs to run itself.

Of course, having code stored at the instance level as well as one or more template levels, where the code is not available statically on the disk of an application directory but is instead stored in the instance persistence area to be run on the fly during self-execution, begs the question of how this code can be debugged during runtime.

In an example embodiment, a runtime execution engine of the cloud-based instance platform loads the instance from the persistence area, and, parallel to the instance data, all of the instance code and recursively all dependent template code is read as well. The application engine then detects that instance code needs to be executed and the runtime environment loads the instance code based on a code generation.

There are two different modes provided: productive mode and debug mode. In productive mode, code is compiled on the fly in the memory of the execution environment. The code instance object is merged into the data instance object and returned. The combined runtime object (also called the instance) may also be loaded into a runtime cache, so that future executions of the instance can be retrieved from the cache without needing to recompile the code.

In debug mode, code is generated on the fly in a special folder, called the debug folder, separately for each instance and set of templates as source code. The source code has dependencies between instances and templates. A runtime cache is invalidated. Invalidation means clearing the instance from the runtime cache. How this is accomplished will vary based on implementation. In some example embodiments, the instance will be removed from the runtime cache. In other example embodiments, the runtime cache corresponds uniquely to the instance and will simply be destroyed, to be rebuilt later when the cache is called again. Generated source code is required during runtime and loaded into the application context. The resulting code object is merged with the loaded instance data object. A breakpoint can be set into the generated source code. A runtime object corresponding to the source code file stops execution at the breakpoint, while the instance runs itself in the cloud instance platform execution context. Instance code is only valid for the time of execution of the instance. Instance changes invalidate the debug generation and trigger regeneration at the next time of instance code execution.

Figure 8:
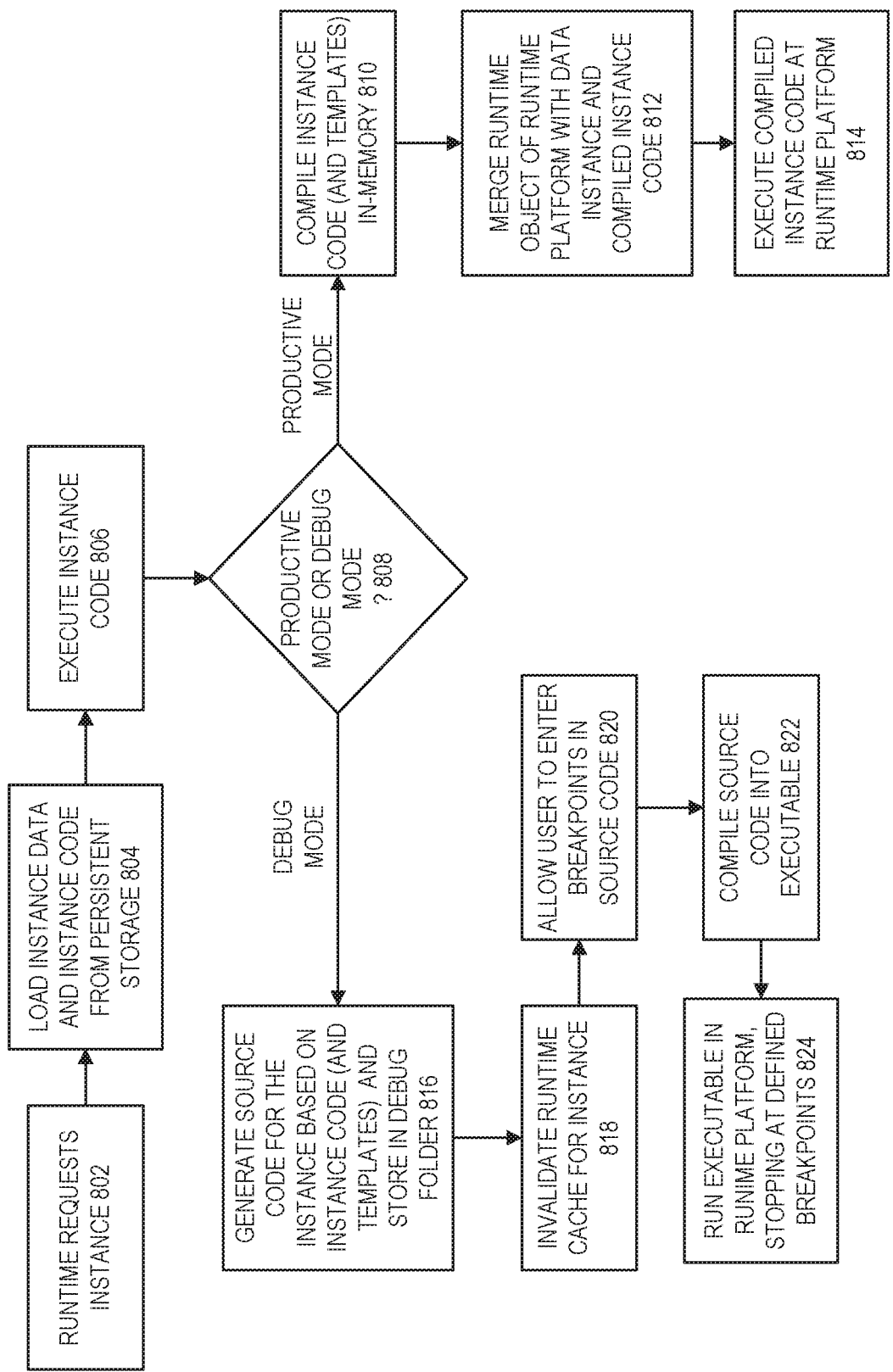
FIG. 8 is a diagram illustrating a method of operating a cloud-based instance platform, in accordance with an example embodiment.

FIG. 8 is a diagram illustrating a method 800 of operating a cloud-based instance platform, in accordance with an example embodiment. At operation 802, a runtime platform requests an instance. This may be due to the runtime platform needing to execute the instance, such as if the instance is called by a software program or requested by a user. At operation 804, instance data and instance code corresponding to the instance are loaded from a persistent storage. The persistent storage may store the instance data and instance code together. It should be noted that, in some example embodiments, "together" means in the same logical container, and it is still possible that the instance data is stored apart from the instance code at the physical level. In some example embodiments, the persistent storage is an in-memory database management system, which may store the instance code and the instance data in a graph network based on column store persistency, using column-optimized tables. At operation 806, the instance code corresponding to the instance is executed. At operation 808, it is determined if the code should operate in a productive mode or a debug mode. In some example embodiments, this can be determined by looking at a flag in the instance code. If the code is to operate in a productive mode, then at operation 810 the code corresponding to the instance (including any templates referenced by the code corresponding to the instance) is compiled in memory. At operation 812, a runtime object of the runtime platform is merged with a data instance and the compiled instance code. Then, at operation 814, the compiled instance code is executed by the runtime platform.

If at operation 808 it was determined that the code should operate in a debug mode, then at operation 816 source code for the instance is generated based on the instance code (and any templates referenced by the instance code, as well as any templates referenced by the templates, in an iterative fashion) and stored in a debug folder. In some example embodiments, this debug folder may be stored in the in-memory database management system. At operation 818, a runtime cache for the instance is invalidated. At operation 820, the user is permitted to enter breakpoints in the source code in the debug folder. At operation 822, the source code for the instance is compiled into an executable file. This compiling action may also include adding the one or more breakpoints to the executable. At operation 824, the executable is run in the runtime platform, with the runtime stopping at defined breakpoints. Notably, this executable file, having been created just for debugging purposes, is not persisted in the instance itself.

Figure 9:
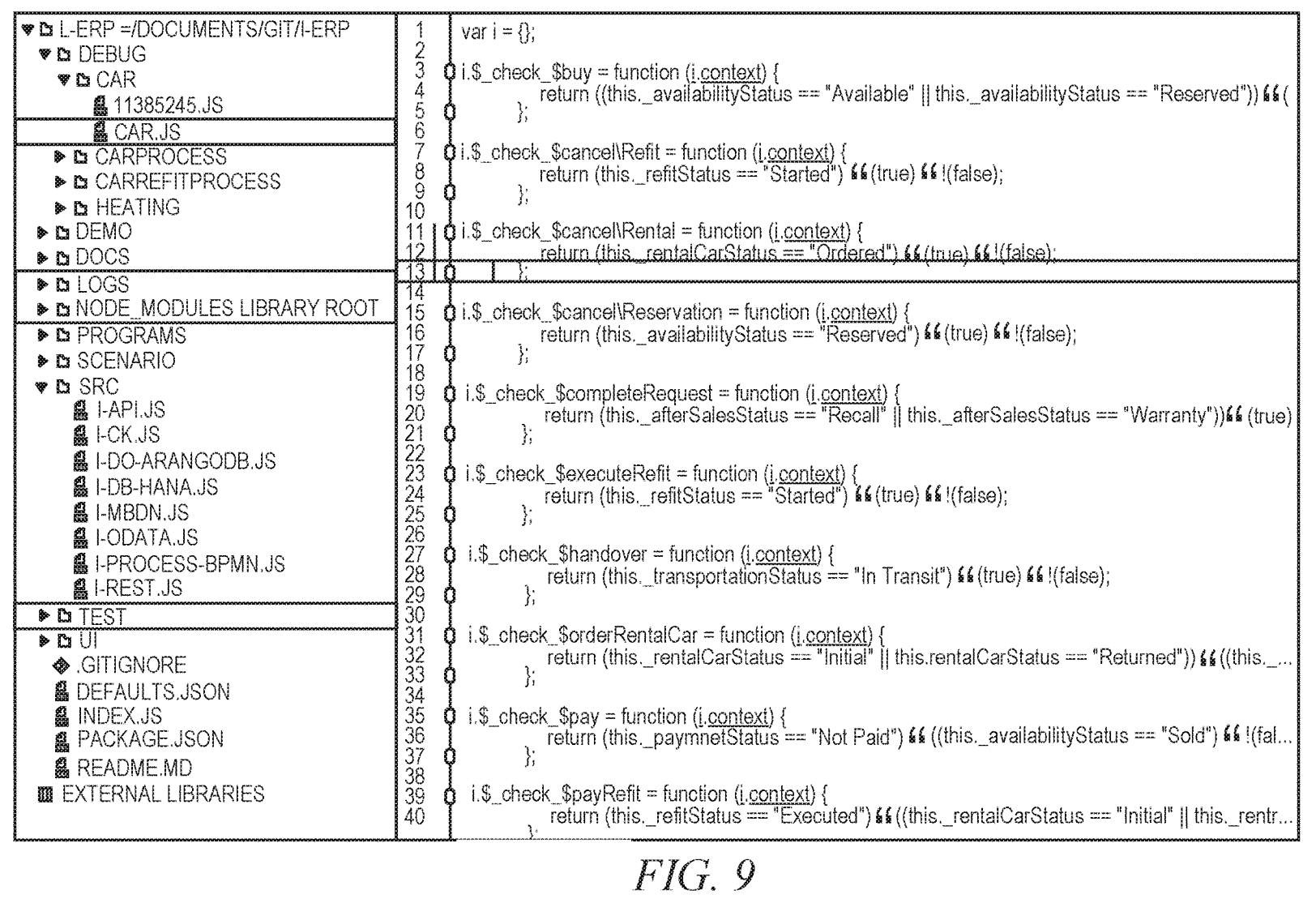

FIG. 9 is a diagram illustrating generated debug code for a template, in accordance with an example embodiment. Here, the exemplary template "Car" is created as a debuggable source file on the fly, in the debug folder. The functions are registered to the public interface of the source file.

FIG. 10 is a diagram illustrating generated debug code for an instance. The instance code is generated in the debug folder, in the context of the template, on the instance level, identified by the instance key with a debuggable source file. It can be seen that the instance code needs the template code as a dependency and merges the instance code function with the template code. Thus, the function $_check_$buy overrides the template function with the same name. The public interface is exported to the outside runtime environment.

EXAMPLES

Example 1

A system comprising:
at least one hardware processor; and
a computer-readable medium storing instructions, which when executed by the at least one hardware processor, cause the at least one hardware processor to perform operations comprising:
  receiving a request from a runtime platform to run an instance of a software function;
  in response to the receiving, loading instance code and instance data corresponding to the instance from a persistent storage, the instance code and instance data being stored together in the persistent storage;
  determining whether there is an indication that the instance code should be executed in a debug mode; and
  in response to a determination that the instance code should be executed in the debug mode:
    generating source code for the instance, based on the instance code, in a debug folder in the persistent storage;
    invalidating a runtime cache for the instance;
    compiling the source code for the instance into an executable file, the compiling including adding one or more breakpoints to the executable file; and
    sending the executable file to the runtime platform for execution.

Example 2

The system of Example 1, wherein the determining that the instance code should be executed in a debug mode includes determining that the instance code contains a flag indicating that it should be executed in debug mode.

Example 3

The system of Examples 1 or 2, wherein the generating source code includes:
  retrieving one or more template codes referenced by the instance code;
  recursively retrieving any additional template codes referenced directly or indirectly by the one or more template codes;
  generating source code for the instance based on the instance code and the one or more template codes referenced by the instance code and any additional template codes referenced directly or indirectly by the one or more template codes.

Example 4

The system of any of Examples 1-3, wherein the persistent storage is an in-memory database management system.

Example 5

The system of Example 4, wherein the in-memory database management system stores the instance code and the instance data in a graph network.

Example 6

The system of Example 5, wherein the in-memory database management system models the graph network based on column store persistency, using column-optimized tables.

Example 7

The system of any of Examples 1-6, wherein the operations further comprise:
  in response to a determination that the instance code should be executed in a productive mode:
    compiling the instance code into an executable file;
    sending the executable file to the runtime platform for merging with a runtime object storing the instance data and for execution.

Example 8

A computerized method comprising:
  receiving a request from a runtime platform to run an instance of a software function;
  in response to the receiving, loading instance code and instance data corresponding to the instance from a persistent storage, the instance code and instance data being stored together in the persistent storage;
  determining whether there is an indication that the instance code should be executed in a debug mode; and
  in response to a determination that the instance code should be executed in the debug mode:
    generating source code for the instance, based on the instance code, in a debug folder in the persistent storage;
    invalidating a runtime cache for the instance;
    compiling the source code for the instance into an executable file, the compiling including adding one or more breakpoints to the executable file; and
    sending the executable file to the runtime platform for execution.

Example 9

The method of Example 8, wherein the determining that the instance code should be executed in a debug mode includes determining that the instance code contains a flag indicating that it should be executed in debug mode.

Example 10

The method of Examples 8 or 9, wherein the generating source code includes:
retrieving one or more template codes referenced by the instance code;
recursively retrieving any additional template codes referenced directly or indirectly by the one or more template codes;
generating source code for the instance based on the instance code and the one or more template codes referenced by the instance code and any additional template codes referenced directly or indirectly by the one or more template codes.

Example 11

The method of any of Examples 8-10, wherein the persistent storage is an in-memory database management system.

Example 12

The method of Example 11, wherein the in-memory database management system stores the instance code and the instance data in a graph network.

Example 13

The method of Example 12, wherein the in-memory database management system models the graph network based on column store persistency, using column-optimized tables.

Example 14

The method of any of Examples 8-13, wherein the operations further comprise:
in response to a determination that the instance code should be executed in a productive mode:
compiling the instance code into an executable file;
sending the executable file to the runtime platform for merging with a runtime object storing the instance data and for execution.

Example 15

A non-transitory machine-readable storage medium comprising instructions, which when implemented by one or more machines, cause the one or more machines to perform operations comprising:
receiving a request from a runtime platform to run an instance of a software function;
in response to the receiving, loading instance code and instance data corresponding to the instance from a persistent storage, the instance code and instance data being stored together in the persistent storage;
determining whether there is an indication that the instance code should be executed in a debug mode; and
in response to a determination that the instance code should be executed in the debug mode:
generating source code for the instance, based on the instance code, in a debug folder in the persistent storage;
invalidating a runtime cache for the instance;
compiling the source code for the instance into an executable file, the compiling including adding one or more breakpoints to the executable file; and
sending the executable file to the runtime platform for execution.

Example 16

The non-transitory machine-readable storage medium of Example 15, wherein the determining that the instance code should be executed in a debug mode includes determining that the instance code contains a flag indicating that it should be executed in debug mode.

Example 17

The non-transitory machine-readable storage medium of Examples 15 or 16, wherein the generating source code includes:
retrieving one or more template codes referenced by the instance code;
recursively retrieving any additional template codes referenced directly or indirectly by the one or more template codes;
generating source code for the instance based on the instance code and the one or more template codes referenced by the instance code and any additional template codes referenced directly or indirectly by the one or more template codes.

Example 18

The non-transitory machine-readable storage medium of any of Examples 15-17, wherein the persistent storage is an in-memory database management system.

Example 19

The non-transitory machine-readable storage medium of Example 18, wherein the in-memory database management system stores the instance code and the instance data in a graph network.

Example 20

The non-transitory machine-readable storage medium of Example 19, wherein the in-memory database management system models the graph network based on column store persistency, using column-optimized tables.

Figure 11:
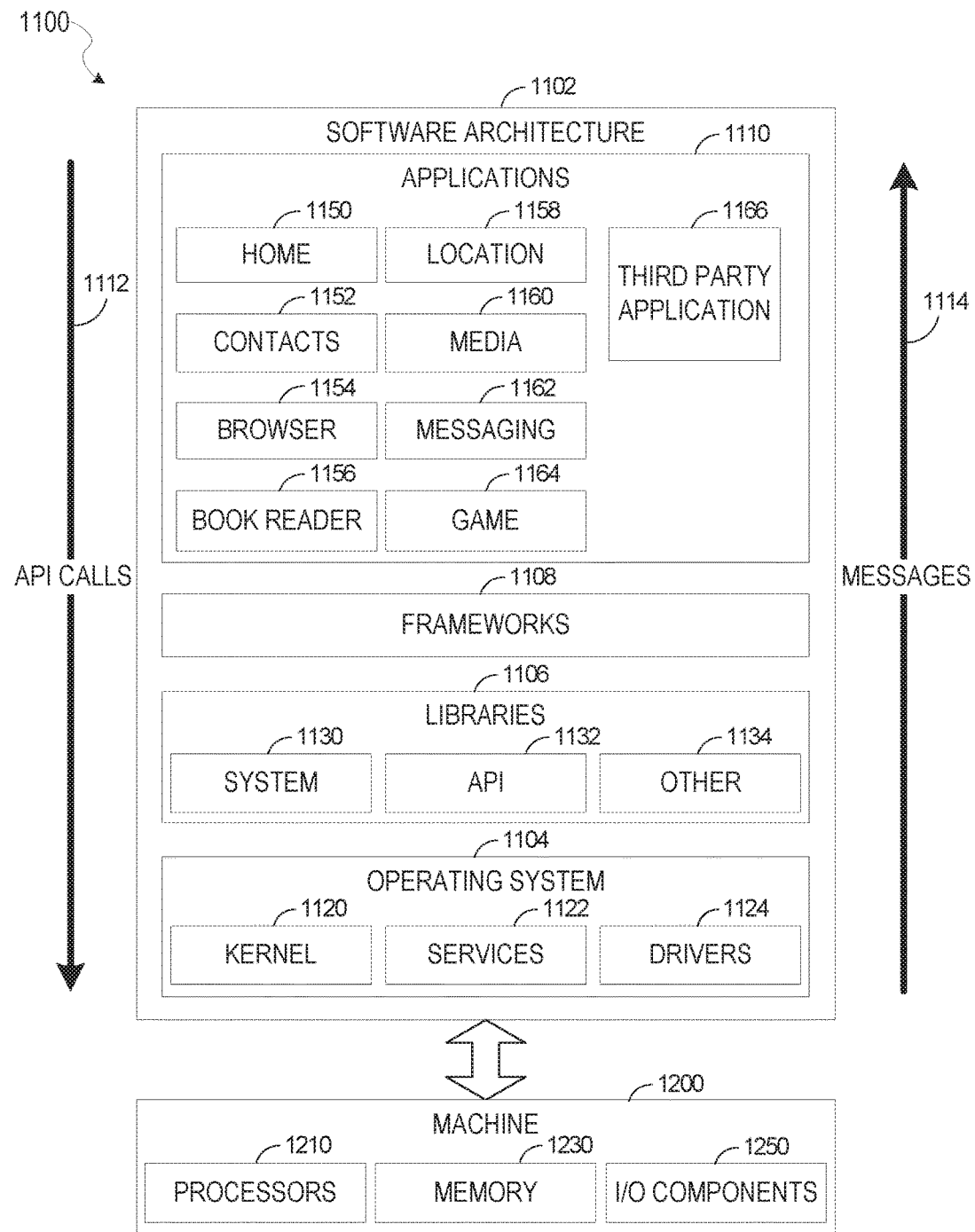
FIG. 11 is a block diagram illustrating an architecture of software, which can be installed on any one or more of the devices described above.

FIG. 11 is a block diagram 1100 illustrating an architecture of software 1102, which can be installed on any one or more of the devices described above. FIG. 11 is merely a non-limiting example of a software architecture, and it will be appreciated that many other architectures can be implemented to facilitate the functionality described herein. In various embodiments, the software 1102 is implemented by hardware such as a machine 1200 of FIG. 12 that includes processors 1210, memory 1230, and I/O components 1250. In this example architecture, the software 1102 can be conceptualized as a stack of layers where each layer may provide a particular functionality. For example, the software 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Figure 12:
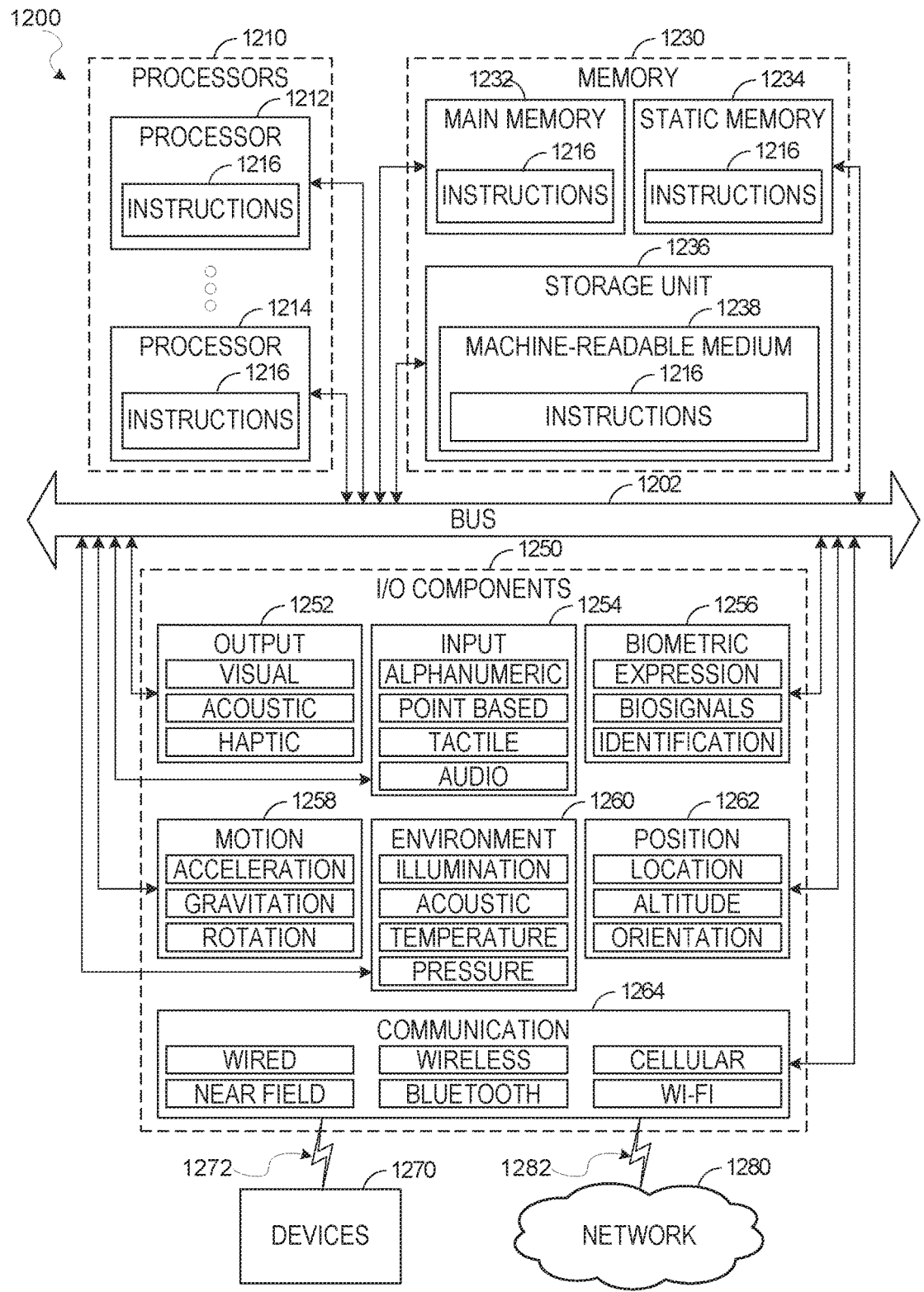
FIG. 12 illustrates a diagrammatic representation of a machine in the form of a computer system within which a set of instructions may be executed for causing the machine to perform any one or more of the methodologies discussed herein, according to an example embodiment.

FIG. 12 illustrates a diagrammatic representation of a machine 1200 in the form of a computer system within which a set of instructions may be executed for causing the machine to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute the method 800 of FIG. 8. Additionally, or alternatively, the instructions 1216 may implement FIGS. 1-10, and so forth. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory 1230 may include a main memory 1232, a static memory 1234, and a storage unit 1236, both accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include RFID tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1230, 1232, 1234, and/or memory of the processor(s) 1210) and/or the storage unit 1236 may store one or more sets of instructions and data structures (e.g., software) embodying or utilized by any one or more of the methodologies or functions described herein. These instructions (e.g., the instructions 1216), when executed by the processor(s) 1210, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices, magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1280 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method executed at least one hardware processor, the method comprising:
    receiving a request from a runtime platform to run an instance of a software function;
    in response to the receiving, loading instance code and instance data corresponding to the instance from a persistent storage into a runtime cache for the instance, the instance code and the instance data being stored together in the persistent storage, wherein the persistent storage is an in-memory database management system that stores the instance code and the instance data in a graph network, wherein the in-memory database management system models the graph network based on column store persistency, using column-optimized tables;
    determining that there is an indication that the instance code should be executed in a debug mode; and
    in response to a determination that the instance code should be executed in the debug mode:
    generating source code for the instance, based on the instance code, in a debug folder in the persistent storage;
    invalidating the runtime cache for the instance;
    compiling the source code for the instance into an executable file, the compiling including adding one or more breakpoints to the executable file; and
    sending the executable file to the runtime platform for execution.

2. The method of claim 1, wherein the determining that the instance code should be executed in the debug mode includes determining that the instance code contains a flag indicating that it should be executed in the debug mode.

3. The method of claim 1, wherein the generating the source code includes:
    retrieving one or more template codes referenced by the instance code;
    recursively retrieving any additional template codes referenced directly or indirectly by the one or more template codes; and
    generating the source code for the instance based on the instance code, the one or more template codes referenced by the instance code, and the additional template codes referenced directly or indirectly by the one or more template codes.

4. The method of claim 1, further comprising:
    in response to a determination that the instance code should be executed in a productive mode:
    compiling the instance code into an executable file; and
    sending the executable file to the runtime platform for merging with a runtime object storing the instance data and for execution.

5. A system comprising:
    at least one hardware processor; and
    a computer-readable medium storing instructions, which when executed by the at least one hardware processor, cause the at least one hardware processor to perform operations comprising:
    receiving a request from a runtime platform to run an instance of a software function;
    in response to the receiving, loading instance code and instance data corresponding to the instance from a persistent storage into a runtime cache for the instance, the instance code and the instance data being stored together in the persistent storage, wherein the persistent storage is an in-memory database management system that stores the instance code and the instance data in a graph network, wherein the in-memory database management system models the graph network based on column store persistency, using column-optimized tables;

determining that there is an indication that the instance code should be executed in a debug mode; and in response to a determination that the instance code should be executed in the debug mode:

generating source code for the instance, based on the instance code, in a debug folder in the persistent storage;

invalidating the runtime cache for the instance;

compiling the source code for the instance into an executable file, the compiling including adding one or more breakpoints to the executable file; and sending the executable file to the runtime platform for execution.

6. The system of claim 5, wherein the determining that the instance code should be executed in the debug mode includes determining that the instance code contains a flag indicating that it should be executed in the debug mode.

7. The system of claim 5, wherein the generating the source code includes:

retrieving one or more template codes referenced by the instance code;

recursively retrieving any additional template codes referenced directly or indirectly by the one or more template codes; and generating the source code for the instance based on the instance code, the one or more template codes referenced by the instance code, and the additional template codes referenced directly or indirectly by the one or more template codes.

8. The system of claim 5, wherein the operations further comprise:

in response to a determination that the instance code should be executed in a productive mode:

compiling the instance code into an executable file; and sending the executable file to the runtime platform for merging with a runtime object storing the instance data and for execution.

9. A non-transitory machine-readable storage medium comprising instructions, which when implemented by one or more machines, cause the one or more machines to perform operations comprising:

receiving a request from a runtime platform to run an instance of a software function;

in response to the receiving, loading instance code and instance data corresponding to the instance from a persistent storage into a runtime cache for the instance, the instance code and the instance data being stored together in the persistent storage, wherein the persistent storage is an in-memory database management system that stores the instance code and the instance data in a graph network, wherein the in-memory database management system models the graph network based on column store persistency, using column-optimized tables;

determining that there is an indication that the instance code should be executed in a debug mode; and in response to a determination that the instance code should be executed in the debug mode:

generating source code for the instance, based on the instance code, in a debug folder in the persistent storage;

invalidating the runtime cache for the instance;

compiling the source code for the instance into an executable file, the compiling including adding one or more breakpoints to the executable file; and sending the executable file to the runtime platform for execution.

10. The non-transitory machine-readable storage medium of claim 9, wherein the determining that the instance code should be executed in the debug mode includes determining that the instance code contains a flag indicating that it should be executed in the debug mode.

11. The non-transitory machine-readable storage medium of claim 9, wherein the generating the source code includes:

retrieving one or more template codes referenced by the instance code;

recursively retrieving any additional template codes referenced directly or indirectly by the one or more template codes; and generating the source code for the instance based on the instance code, the one or more template codes referenced by the instance code, and the additional template codes referenced directly or indirectly by the one or more template codes.

* * * * *